United States Patent [19]
Endo

[11] Patent Number: 5,974,392
[45] Date of Patent: Oct. 26, 1999

[54] WORK FLOW SYSTEM FOR TASK ALLOCATION AND REALLOCATION

[75] Inventor: Yoshiei Endo, Tokyo, Japan

[73] Assignee: Kabushiki Kaisha Toshiba, Kawasaki, Japan

[21] Appl. No.: 08/600,530

[22] Filed: Feb. 13, 1996

[30] Foreign Application Priority Data

Feb. 14, 1995 [JP] Japan ................................. 7-025171
Nov. 14, 1995 [JP] Japan ................................. 7-295577

[51] Int. Cl.$^6$ .................................................. G06F 17/60
[52] U.S. Cl. ..................................... 705/8; 705/7; 705/9
[58] Field of Search ................................. 705/6, 7, 8, 9

[56] References Cited

U.S. PATENT DOCUMENTS

| | | | |
|---|---|---|---|
| 5,111,391 | 5/1992 | Fields et al. ............................. | 364/401 |
| 5,197,004 | 3/1993 | Sobotka et al. ......................... | 364/419 |
| 5,270,920 | 12/1993 | Pearse et al. ........................... | 364/401 |
| 5,530,861 | 6/1996 | Diamant et al. ........................ | 395/650 |
| 5,826,239 | 10/1998 | Du et al. ................................... | 705/8 |
| 5,848,393 | 12/1998 | Goodridge et al. ..................... | 705/8 |
| 5,873,067 | 2/1999 | Kobayashi ............................... | 705/8 |

*Primary Examiner*—Allen R. MacDonald
*Assistant Examiner*—Michele Stuckey Crecca
*Attorney, Agent, or Firm*—Finnegan, Henderson, Farabow, Garrett & Dunner, L.L.P.

[57] ABSTRACT

A work flow system is disclosed in which, when a manager server unit of a work flow system divides a work effort into a plurality of tasks and execute the tasks, the manager server unit allocates tasks to client units of task execution persons fitted for the tasks. The work flow system includes a personal data file that stores personal data of each task execution person and an ability to perform each executable task, and a function for allocating tasks to client units of task execution persons. The function for allocating tasks to client units of task execution persons. The function for allocating tasks to client units of task execution persons allocates tasks based on the personal data file. The personal data file is renewed based on results of completed tasks.

9 Claims, 13 Drawing Sheets

FIG. 3

| TASK EXECUTION PERSON NAME | ID | PASSWORD | EXECUTABLE TASK | YEARS OF EXPERIENCE | ADAPTABILITY | KNOWLEDGE | SPEEDINESS | ACCURACY | EXPECTED VALUE | SECURITY | TASK RANGE | NUMBER OF TASK TO BE COMPLETED |
|---|---|---|---|---|---|---|---|---|---|---|---|---|
| B | 1234 | 676 | T1 | 7 | 6 | 8 | 9 | 12 | 10 | | | 2 |
|   |   |   | T2 | 2 | 3 | 3 | 6 | 4 | 7 | | | |
| F | 1654 | 765 | T3 | | | | | | | | | |
|   |   |   | T4 | | | | | | | | | |
| A | | | T1 | | | | | | | | | |
|   |   |   | T5 | | | | | | | | | |

| FLOW | FLOW A | | | | | FLOW B |
|---|---|---|---|---|---|---|
| | T1 → | T2 → | T3 → | T4 → | T5 | |
| TASK EXECUTION PERSON | A | B | C | D | E | |
| PERIOD OF TASK | 1994 6/8 | 1994 6/10 | 1994 6/16 | 1994 6/18 | 1994 6/20 | |
| TOTAL PERIOD | 1994. 6. 30 | | | | | |
| BYPASS CONDITION | GOOD | GOOD | BAD | GOOD | GOOD | |
| ROUTE CHANGE CONDITION | | | BAD | | | |
| STATUS | COMPLETE | 60% | | | | |

FIG. 4

| TITLE | RECEIVED TIME AND DATA | COUNT OF APPEARANCE OF KEY WORDS | | | ATTRIBUTE PRIORITY | PRIORITY |
|---|---|---|---|---|---|---|
| | | HIGH | MIDDLE | LOW | | |
| A | 1995 06/10 | 4 | 3 | 4 | 0 | |
| B | 1995 06/13 | 5 | 1 | 2 | 2 | |
| C | 1995 06/17 | 4 | 2 | 0 | 4 | |
| ------- | ------- | ------- | ------- | ------- | ------- | ------- |

| TITLE | HIGH | ATTRIBUTE PRIORITY | MIDDLE | LOW | PRIORITY |
|---|---|---|---|---|---|
| A | 4 | 0 | 3 | 4 | 1 |
| B | 5 | 2 | 1 | 2 | 3 |
| C | 4 | 4 | 2 | 0 | 2 |
| ⋮ | ⋮ | ⋮ | ⋮ | ⋮ | ⋮ |

FIG. 11(a)

| TITLE | HIGH | ATTRIBUTE PRIORITY | MIDDLE | LOW | PRIORITY |
|---|---|---|---|---|---|
| A | 4 | 3 | 0 | 4 | 2 |
| B | 5 | 1 | 2 | 2 | 3 |
| C | 4 | 2 | 4 | 0 | 1 |
| ⋮ | ⋮ | ⋮ | ⋮ | ⋮ | ⋮ |

FIG. 11(b)

WORK FLOW SYSTEM FOR TASK ALLOCATION AND REALLOCATION

BACKGROUND OF THE INVENTION

1. Field of the Invention

The present invention relates to a work flow system for controlling a flow of work by using computers and more particularly to a work flow system which automatically modifies a task flow once created and a task execution person allocated, when necessary.

2. Description of the Related Art

It is a common practice of companies and government offices to divide each created work into a plurality of tasks common to each task and to allocate each task to a specific task execution person who specializes in that task to improve the efficiency of the work as a whole.

The same applies to various works using computers. As shown in FIG. 13, one work effort is divided into five tasks 33 (T1, T2, T3, T4 and T5) for example. A different task execution person 34 (A, B, C, D and E) is assigned to the tasks (T1 through T5) and an execution sequence among the tasks (T1 through T5) is defined by a flow as shown by arrows in the figure for example.

Then, a task flow of the pertinent work in FIG. 13 is defined by the plurality of tasks (T1 through T5) composing one work effort, the task execution person (A through E) and the flow representing the execution sequence among the tasks (T1 through T5).

A computer system for controlling such a flow of tasks is called a work flow system. In the work flow system, a client unit of task execution person such as a workstation is provided to each task execution person 34 belonging to one unit group such as one department or section and is connected with other client units of task execution person through a network such as a LAN. A workflow manager server unit operated by a manager of the group is also connected to the network.

The work flow manager server unit creates each task flow described above for each created work effort and allocates each task 33 composing the task flow to each client unit of task execution person who takes charge of the pertinent task.

In the task flow shown in FIG. 13 for example, the work flow manager server unit sends the first task 33 (T1) to the client unit of task execution person A 34 who takes charge of that task 33 and urges the task execution person A of the client unit of task execution person to execute the allocated task 33. When the processing of the task (T1) is completed with that client unit of execution person, a storage container called a folder for storing results such as a document and drawings created in the task (T1) is transferred to the client unit of a task execution person B 34 to which the next task 33 (T2) is allocated.

Then, the work flow manager server unit 18 instructs the task execution person B 34 of the client unit of task execution person to which the folder has been transferred to execute the allocated the task (T2). When the processing of the task (T2) is completed, the folder is transferred to the client unit of task execution person of the next task 33 (T3) to execute the next task 33 (T3).

The folder, having the results, is moved sequentially by advancing the task 33 sequentially in accordance to the flow set in advance. It should be noted that the movement of the folder is performed by copying it to a specified directory of the client unit of the task execution person 34 assigned to the task 33 to which the folder is moved.

In such a workflow system for controlling an execution of a task flow, however, the manager of the group who controls the work flow system used to design the task flow composed of a plurality of tasks, a plurality of task execution persons and a flow pertinent to that work effort based on his long experience and perception when a necessary work effort is created.

For example, when one work effort is created, the manager divides the work effort into a plurality of tasks and assigns a task execution person who is most versed in each task to the pertinent task. However, even if the task execution person excels in the ability in performing the task, there is a case when the task execution person can complete the task within a predetermined time when a plurality of tasks are created in the same period of time and are incorporated to each task flow and when a large amount of tasks are assigned to that task execution person for example.

Further, when one task could not be executed in the process of executing a task in accordance to a flow by some reason, it becomes necessary to recreate the task flow including reassignment of a task execution person to the pertinent task.

Further, because the group manager who creates the task flow does not necessarily know well about the ability of all task execution persons belonging to his own group in performing each task, the best task flow may not be always created for the inputted task.

Still more, even in each client unit of task execution person to which each task is transferred directly from the work flow manager server unit or indirectly from the preceding client unit of execution person in accordance to the flow, the task execution person of the client unit may not be able to execute the task within an allowable time even if he/she is instructed to do so when a large number of tasks are transferred to that client unit of task execution person in a short time.

In this case, there may be a task which can be executed by another task execution person in lieu of the pertinent task execution person among the large number of tasks allocated to the pertinent task execution person.

Further, when a large number of tasks are transferred in a short time and when the tasks are executed in a received order for example, there is a fear that an execution of an urgent work or an important task is put behind that of tasks of less important tasks.

SUMMARY OF THE INVENTION

Accordingly, it is an object of the present invention to provide a work flow system which allocates a task execution person to each task by a manager server unit based on personal data including an execution result of completed tasks, can operate the task flow always in the best condition without requiring manual works and can improve a work efficiency of the operation.

It is a further object of the present invention to provide a work flow system which can automatically modify the task flow being executed so as to eliminate the factor disabling the execution when the task becomes unexecutable for some reason in the process of execution, can perform execution of the task, and can improve a reliability of the whole work flow system.

It is a further object of the present invention to provide a work flow system which can previously execute the important task when the task allocated to the client unit of task execution person, can automatically act for another task execution person and can improve a reliability of the whole work flow system and a work efficiency of the operation.

In accordance with the present invention, means for dividing of a manager server unit of a work flow system divides a work effort into a plurality of tasks. Means for allocating of the manager server unit assigns a task execution person to the task divided based on a personal data file stored executable tasks and an ability to perform each the executable task, and allocates the tasks to client unit of the task execution person. The personal data file is always renewed based on execution result of the completed tasks.

In accordance with another aspect of the present invention, task executing means of the manager server unit instructs each task execution person to execute at least one of tasks in accordance with execution sequence based on task flow file stored an execution sequence among the tasks divided, the task execution person allocated for each task, and a status. A task execution person modifying means judges whether the task allocated is completed within a permitted time and changes the task execution person into another task execution person or commences a next one of the tasks in the task flow in accordance with the status when task allocated is not completed within the permitted time.

In accordance with another aspect of the present invention, priority data executing means of client unit of task execution person arranges a task queue based on priority data allocated by the manager server unit reallocates the task execution person allocated tasks exceeding a predetermined number into another task execution person allocated tasks less than the predetermined number.

BRIEF DESCRIPTION OF THE DRAWINGS

FIG. 3 is a table showing storage contents of a personal data file incorporated to the work flow manager server unit of the work flow system;

FIG. 4 is a table showing storage contents of a task flow file incorporated to the work flow manager server unit;

FIG. 10 is a table showing storage contents of a task queue table incorporated to each client unit of task execution person;

FIGS. 11a and 11b are tables for explaining a decision making operation of arranging means incorporated to each client unit of task execution person;

DETAILED DESCRIPTION OF PREFERRED EMBODIMENT

A preferred embodiment of the present invention will be explained below with reference to the drawings.

Figure 1:
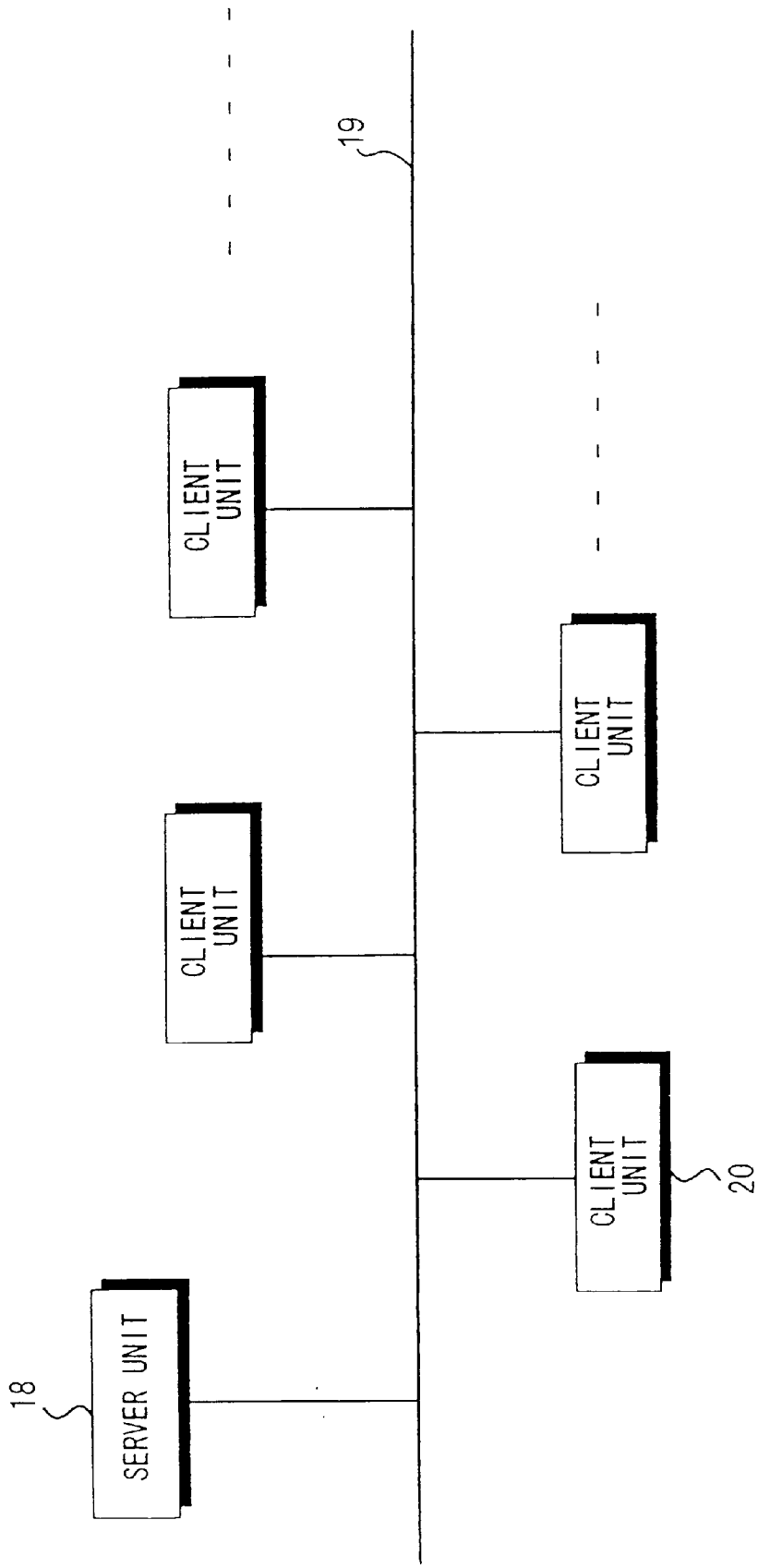
FIG. 1 is a block diagram schematically showing a whole structure of a work flow system according to one embodiment of the present invention.

FIG. 1 is a block diagram schematically showing a whole structure of a work flow system according to the embodiment of the present invention. In the figure, one work flow server unit 18 operated by a manager of a group for performing a work effort and a plurality of client units 20 operated by each task execution person who belongs to that group and who takes charge of various tasks are connected to a transmission path 19 of a network such as a LAN.

The work flow manager server unit 18 compiles each created work effort into a task flow composed of a plurality of tasks, allocates each task composing the created task flow to each task execution person and controls an execution sequence of each task as a flow. Each client unit 20 of a task execution person executes each task allocated to the task execution person who operates that client unit 20.

Figure 2:
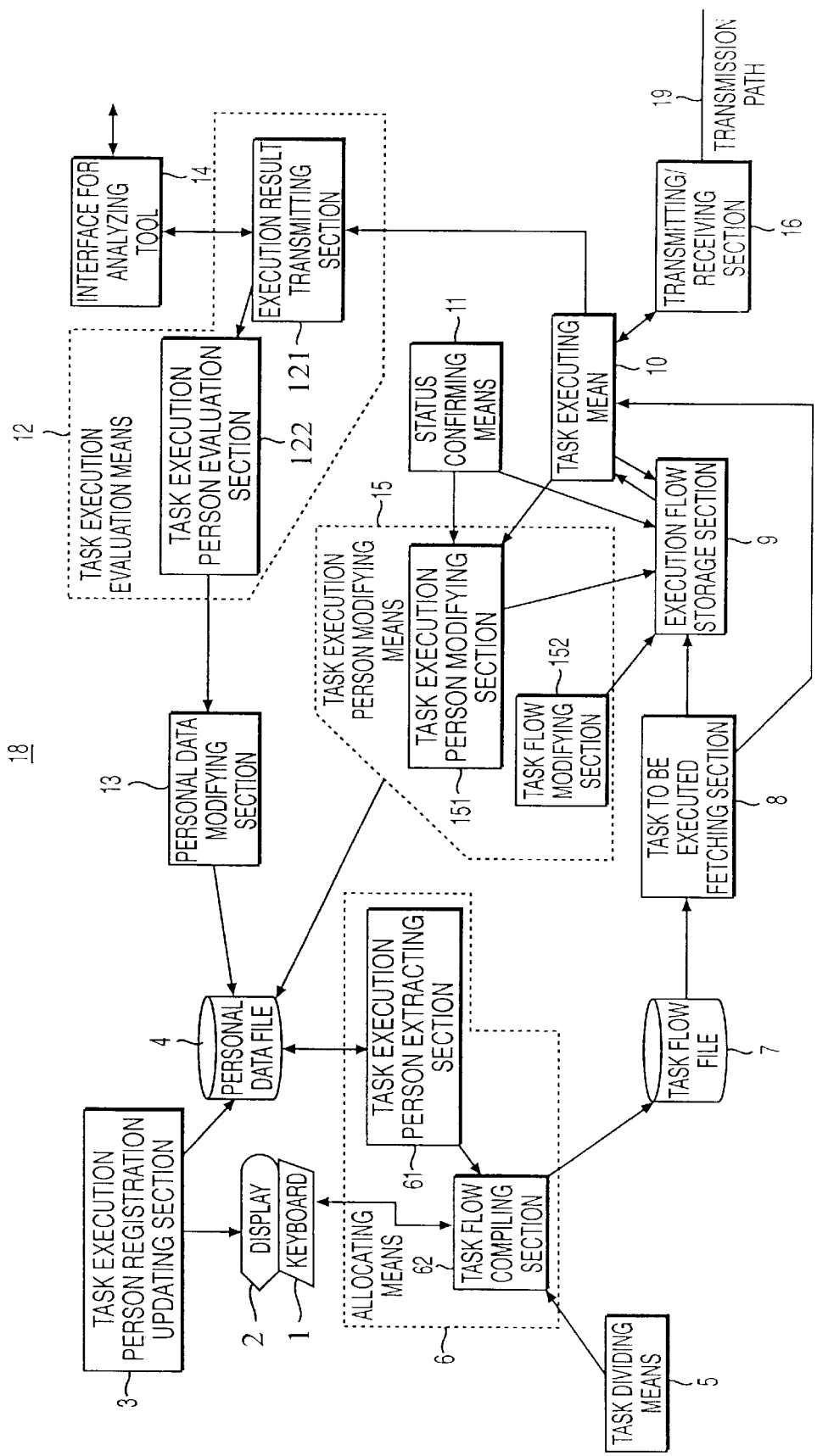
FIG. 2 is a block diagram schematically showing a structure of a work flow manager server unit of the work flow system according to one embodiment of the present invention.

A concrete structure and operation of the work flow manager server unit 18 will be explained below. FIG. 2 is a block diagram schematically showing a structure of the work flow manager server unit 18. The work flow manager server unit 18 is configured by a type of information processor such as a computer.

The work flow manager server unit 18 comprises a task execution person registration updating section 3, to which a man-machine unit composed of a keyboard 1 and a display unit 2 is incorporated, for setting personal data of each task execution person who belongs to the group performing a work effort and takes charge of various tasks, and a personal data file 4 composed of a HDD (hard disk drive unit) or the like for storing personal data created by the task execution person registration updating section 3. Unit 18 also includes a task dividing means 5 for dividing a work effort into plurality of tasks, task execution person allocating means 6, composed of a task execution person extracting section 61 for extracting a task execution person who can take charge of an appropriate task based on the personal data, a task flow compiling section 62 for creating a task flow such as an assignment of a task execution person in charge to an appropriate task, for allocating the tasks divided by task dividing means 5 to client units 20 of each task execution person extracted based on the personal data 4, a task flow file 7 for storing the created task flow, and a task-to-be-executed fetching section 8 for reading out a task to be executed. Unit 18 further includes an execution flow storage section 9 formed by a storage device such as a RAM for storing a task flow currently being executed and status of tasks allocated, a task executing means 10 for having each task execution person execute the tasks divided by the task dividing means 5, status confirming means 11 for confirming a status of tasks stored in the task flow file 7, and a task execution evaluating means 12 composed of an execution result transmitting section 121 for transmitting the execution results of the tasks to a task execution person evaluating section 122 which write later, a task execution person evaluating section 122 for evaluating an ability to perform tasks from the execution results of the tasks, for evaluating an ability to perform tasks from the execution results of the tasks. The work flow manager server unit 18 yet further includes a personal data modifying section 13 for modifying the personal data based on the evaluation of the task execution person, an interface for analyzing tool 14 for sending the result of them execution results transmitting section 121 to the outside, a task execution person modifying means 15, composed of a task execution person modifying section 151 for replacing a task execution person who is unable to execute an allocated task with another task execution person and a task flow modifying section 152 for modifying the task flow when an unexecutable task is brought about, for modifying the task flow or task execution person when such abnormality occurs, and a transmitting/receiving section 16 for exchanging data with each client unit 20 of task execution person via the transmission path 19.

Next, the operation of each section will be explained.

The task execution person registration updating section 3 is composed of the man-machine unit as described above and is used when the manager of the work flow server unit 18 inputs various personal data of each task execution person.

Figure 13:
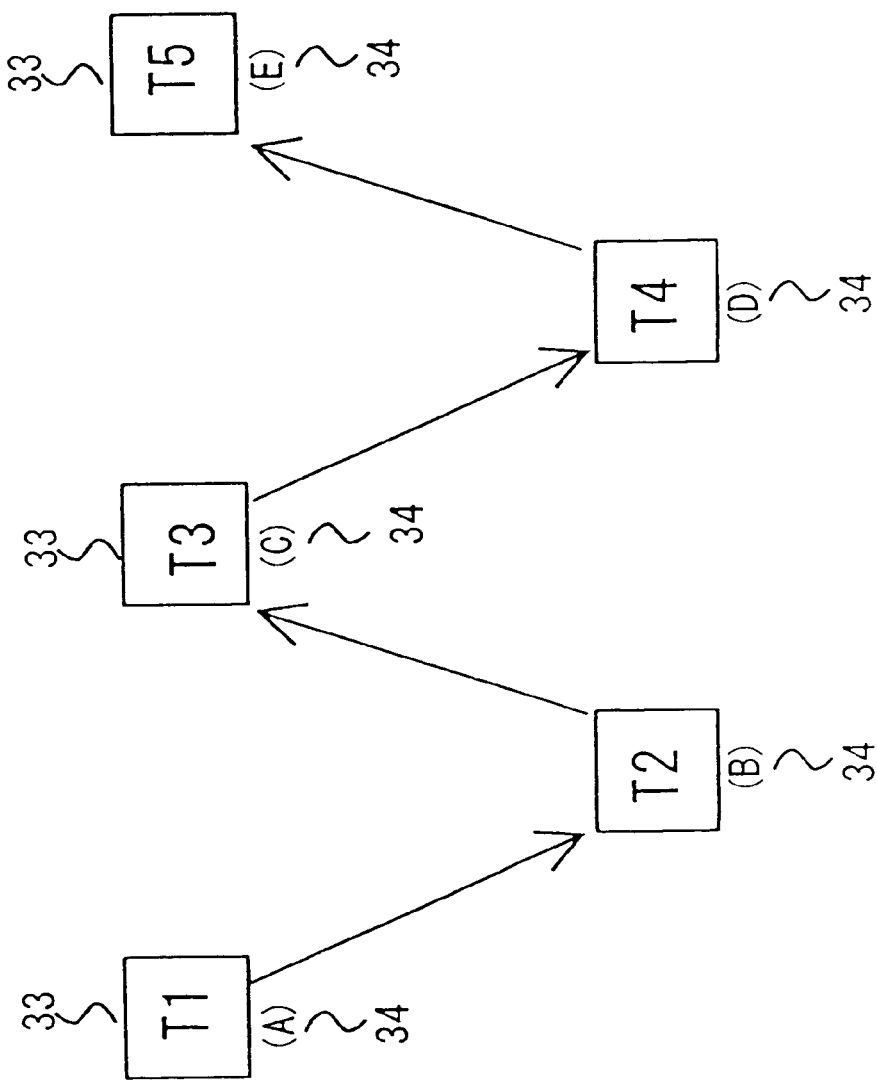
FIG. 13 is a diagram illustrating a typical task flow.

For example, personal data of each task execution person 34 shown in FIG. 13 composing one group such as a department or section is stored within the personal data file 4 created within the HDD. A task execution person's name, an ID number (personal identification code), a password (identification number), one or more executable (chargeable) tasks, years of experience in each task, an adaptability, knowledge, speediness in performing tasks, an accuracy and an expected value are stored per each task execution person as shown in FIG. 3. It is noted that those values are represented by evaluation points from 1 to 12 per each executable task.

Further, security data and a work range corresponding to a work system are set for each task execution person 34. A number of tasks of which an appropriate task execution person 34 currently takes charge is also stored per each task execution person. It is noted that the number of tasks currently in charge is a sum of numbers of tasks obtained by multiplying a factor of difficulty to each task currently in charge in the present embodiment. Accordingly, there exists a task execution person to whom many executable tasks are allocated or a task execution person to whom only one task is allocated.

Each personal data in the personal data file 4 is set and updated when necessary by the manager via the task execution person registration updating section 3 and is also automatically modified by the personal data modifying section 13 when necessary.

The task flow compiling section 62 is a support unit composed of the man-machine unit described above with which the manager of the work flow system sets or compiles a new task flow. That is, in creating a new task flow, the manager divides a created work effort into a plurality of tasks 33 by task dividing means 5 and displays each task on the display screen 1 as shown in FIG. 6.

Figure 6:
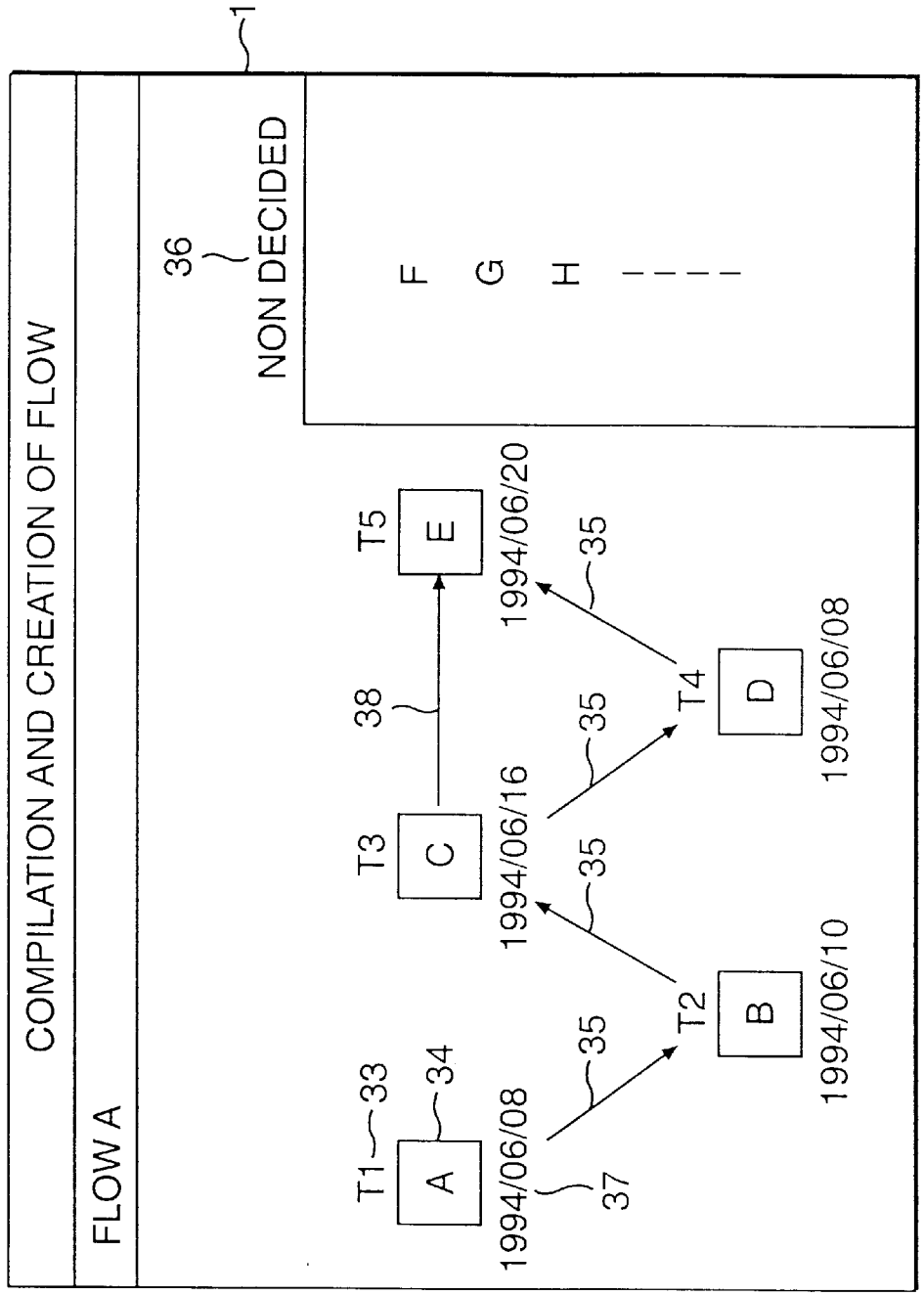
FIG. 6 is a diagram showing a displayed screen when a new task flow is created using the man-machine unit.

Then, the manager inputs an execution sequence among each task 33, i.e., a flow shown in FIG. 6, by arrows 35 indicated by solid lines for example by using a mouse or a cursor. When one task 33 is specified by the mouse, the task flow compiling section 62 specifies the pertinent task 33 to the task execution person extracting section 61 shown in FIG. 2. Then, the task execution person extracting section 61 samples each task execution person 34 who has been registered to be capable of executing the pertinent task based on the personal data stored in the personal data file 4 and sends it back to the task flow compiling section 62.

The task flow compiling section 62 displays each task execution person 34 received from the task execution person extracting section 61 on the display screen 1 as a table of undecided task execution persons 36. The manager selects one task execution person 34 from the table of undecided task execution persons 36 and assigns to the pertinent task 33. Task flow compiling section 4 may also automatically decide the task execution person of the tasks divided by task dividing means 5 based on a composite evaluation point of the personal data includes a years of experience, an adaptability, a knowledge, a speediness, an accuracy and an expected value of each task execution person 34 extracted by the task execution person extracting section 61. At this time, for example, allocating means 6 allocated the task execution person which evaluation point of personal data is highest.

After completing the assignment of the task execution person 34 to all tasks 33 by repeating the above-mentioned procedures, the manager sets a processing period 37 of the task 33 and also establishes a period of disposition until each checkpoint and a plurality checkpoints task to confirm a status of the tasks 33 in the each task 33. Next, the manager registers the task flow created by the above-mentioned procedures and consisted of the plurality of tasks 33 in the work effort, the task execution person 34 assigned to each task 33 and the flow representing the execution sequence of each task 33 to the task flow file 7. At this time, the manager also registers a processing period of the whole work effort a flow name a bypass condition of each task, a route change condition and the like in the same time.

FIG. 4 is a table showing storage contents of the task flow file 7. As shown in the table, a flow name (title), a flow representing an execution sequence of each task (T1 through T5), each task execution person allocated to each task (T1 through T5), a bypass condition per each task and a route change condition are stored in the file per each task flow.

It is noted that the bypass condition per task shows whether the pertinent task can be bypassed without trouble without executing it when it becomes unexecutable by some reason in the process of execution of the task flow.

For example, an arrow 38 shown by a solid line in FIG. 6 shows that when the task 33 which has been allocated to the task execution person D 34 is unexecutable, this task 33 is bypassed. The route change condition shows whether a flow route avoiding the unexecutable task can be set or not.

Figure 5:
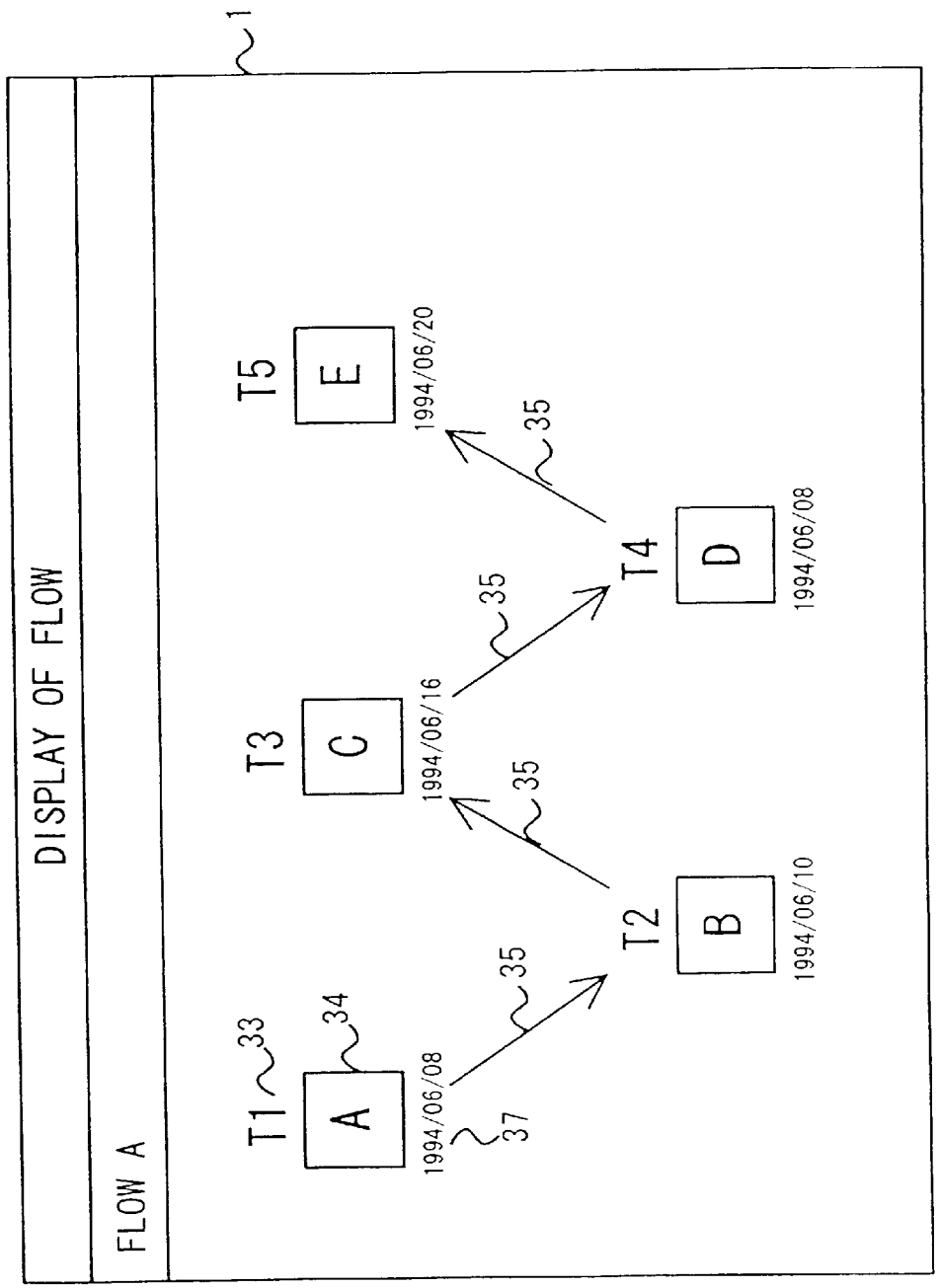
FIG. 5 is a diagram showing a task flow displayed on a man-machine unit incorporated to the work flow manager server unit.

The manager can also display the task flow registered in the task flow file 7 on the display screen 1 simply by specifying the flow name as shown in FIG. 5.

When the manager operates the aforementioned man-machine unit to specify the flow name of the task flow and inputs an execution command in the state when the task flow of the necessary work effort has been written to the task flow file 7, the task-to-be-executed fetching section 8 is activated. It reads the task flow having the pertinent flow name stored in the task flow file 7 and writes it to the execution flow storage section 9. In the same time, the task-to-be-executed fetching section 8 sends a task start command to the task execution means 10.

Figure 7:
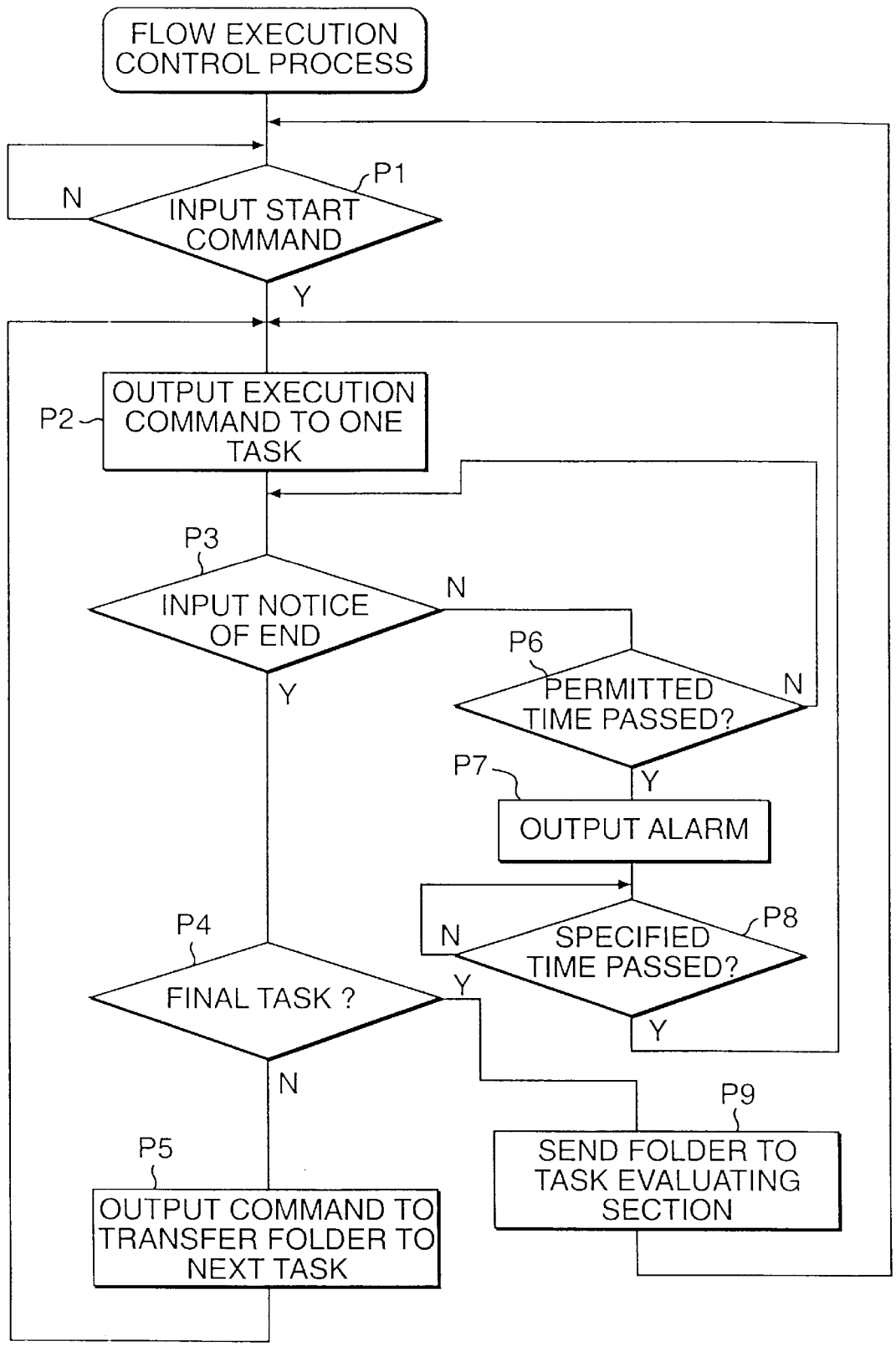
FIG. 7 is a flowchart showing an operation of a task executing means incorporated to the work flow manager server unit.

The task execution means 10 executes a task execution control process for one task flow stored in the execution flow storage section 9 in accordance to the flowchart shown in FIG. 7.

When the start command is input from the task-to-be-executed fetching section 8 in Step P (Program Step) 1 in FIG. 7, an execution command accompanying one task (T) is sent to the client unit 20 of the task execution person to whom the task is allocated via the transmitting/receiving section 16 and the transmission path 19 in Step P2. Then, it is checked in Step P3 and Step P6 whether a notice of end indicating that the execution of the pertinent task was completed has been input or not from the pertinent client unit 20 of task execution person before an elapse of an permitted time obtained from the processing period 37 set for the pertinent task.

When the notice of end has been received from the client unit 20 of execution person within the permitted time, it is determined that the processing of the pertinent task has been completed normally. When it is confirmed in Step P4 that the processed task is not the final task, a transfer command for transferring the folder created in that task to the client unit 20 of the task execution person of the next task (T) indicated in the flow is transmitted to the pertinent client unit 20 of task execution person. Then, by returning to Step P2, a command for executing the task (T) is sent to the client unit 20 of task execution person to which the folder has been transferred.

When it is confirmed in Step P4 that the processed task is the final task (T) specified in the task flow, i.e., when all execution processes pertinent to one task flow stored in the execution flow storage section 9 have been completed, the folder obtained at the final task (T) is sent to the task result transmitting section 121.

It should be noted that the folder contains not only the execution results in the final task (T) but also processing results and each result such as processing time in each task.

When the notice of end is not input even after the elapse of the permitted time obtained from the processing period 37 set for the pertinent task in Step P6, the task executing means 10 considers that some abnormal condition has occurred in the client unit 20 of task execution person executing the pertinent task and that it is unable to execute the task and sends an alarm indicating an occurrence of abnormality and specifying the pertinent task to the task execution person modifying section 15.

When the notice of end is not input even after the elapse of the permitted time obtained from the processing period 37 set for the pertinent task in Step P6, the task executing means 10 may also check the status by referring to each checkpoint of the task stored in execution flow storage section 9 by the status checking means 11. For example, when the status is less than a value of a standard at this time, the task execution means 10 also considers that some abnormal condition has occurred in the client unit 20 of task execution person executing the pertinent task and that it is unable to execute the task and sends an alarm indicating an occurrence of abnormality and specifying the pertinent task to the task execution person modifying section 15. For example, the value of the standard is 50 percent. The value of standard can be set up and freely modified by the manager server unit.

Then, the task executing means 10 returns to Step P2 and sends a command for executing noncompleted task (T) stored in the execution flow storage section 9 after a specified time which is required for the task execution person modifying means 15 to remove the abnormal condition of the client unit 20 of task execution person of the pertinent task.

Next, the operation of the task execution person modifying means 15 will be explained As shown in FIG. 2 the task execution person modifying means 15 consists of the task execution person modifying section 151 and the task flow modifying section 152. The task execution person modifying section 151 has a function of replacing the task execution person who has been assigned to an unexecutable task automatically with another task execution person and the task flow modifying section 152 has a function of changing the flow automatically so as to bypass or avoid an unexecutable task.

The operation of the task execution person modifying means 15 will be explained below in accordance to a flowchart shown in FIG. 8.

Figure 8:
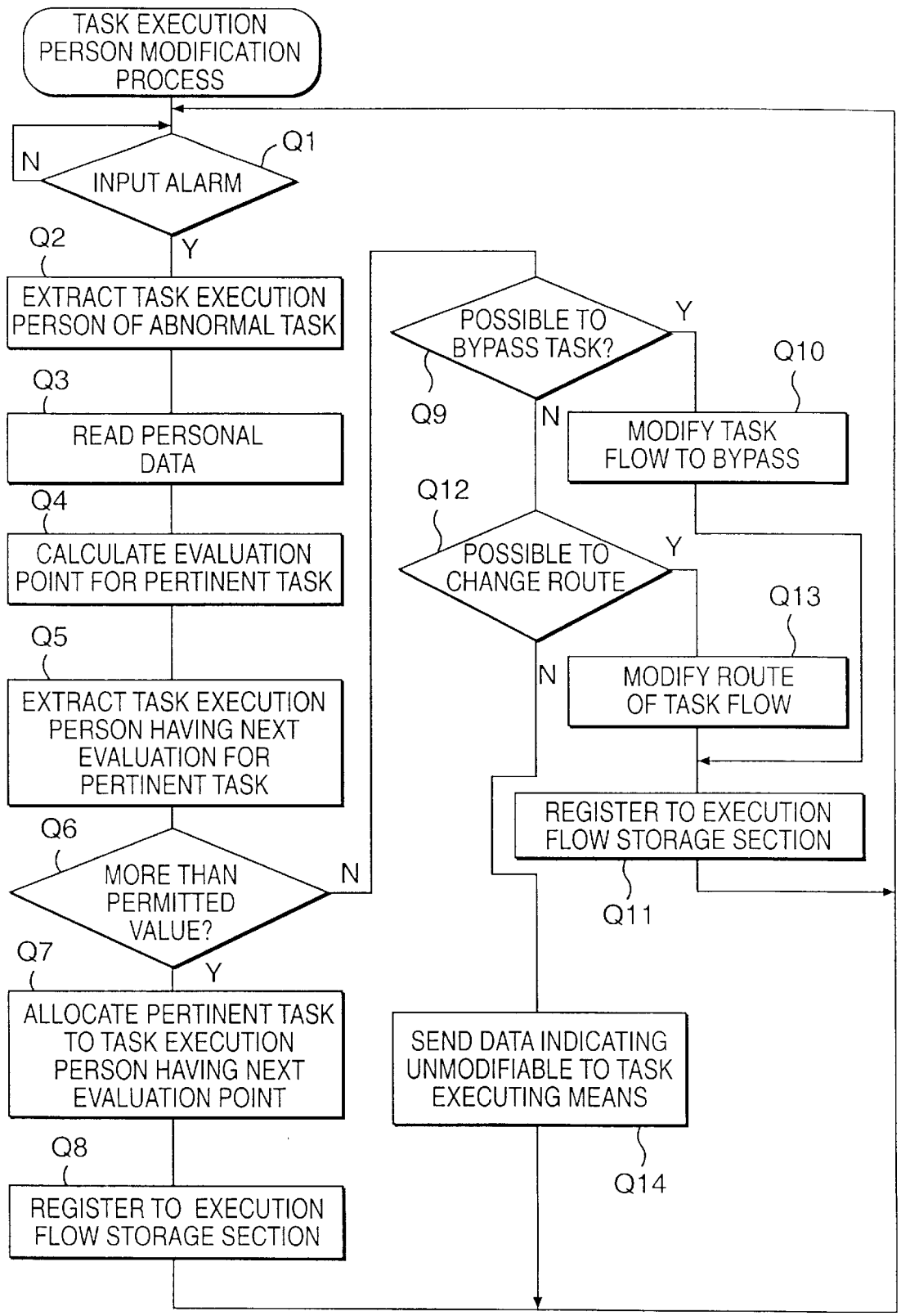
FIG. 8 is a flowchart showing an operation of a task execution person modifying means incorporated to the work flow manager server unit.

When the alarm indicating an occurrence of abnormality is input from the task executing means 10 in Step Q1 of FIG. 8, the task execution person who has been assigned to the unexecutable task (T) is extracted from the execution flow storage section 9 in Step Q2. The personal data of the pertinent task execution person is read from the personal data file 4 in Step Q3. Then, an evaluation point of the pertinent task execution person for the pertinent task obtained by totaling each value shown in FIG. 3 as numerical values with respect to the pertinent task is calculated.

Next, an evaluation point of the pertinent task of each task execution person who is capable of executing the pertinent task is calculated respectively from the personal data file 4 and a task execution person who has an evaluation point next to that of the task execution person who has been judged to be incapable of executing it is sampled in Step Q5.

Then, it is determined in Step Q6 whether or not the evaluation point of the extracted task execution person is more than an permitted lowest evaluation point set in advance. When it is above the permitted lowest evaluation point, the task execution person of the unexecutable task (T) is replaced with that new task execution person in Step Q7. Then, the task flow stored in the execution flow storage section 9 is modified accordingly in Step Q8.

When the evaluation point of the extracted task execution person is below the permitted lowest evaluation point set in advance in Step Q6, i.e., when there is no adequate task execution person who is capable of executing the unexecutable task, it is determined in Step Q9 whether the pertinent task can be bypassed based on the bypass condition of the task flow transferred to the execution flow storage section 9.

In the case when the bypass condition of the pertinent task has been set as possible to bypass, the task flow is changed so as to bypass that task in Step Q10. For example, when the task 33 allocated to the task execution person D 34 among five tasks 33 shown in FIG. 6 is unexecutable, this unexecutable task 33 is bypassed by the flow shown by the arrow 38. Then, the modification result is registered in the task flow stored in the execution flow storage section 9 in Step Q11.

In the case when a bypass condition indicating as unmodifiable has been set for the pertinent task (T) in Step Q9, the flow route change condition of the whole task flow is checked in Step Q12.

When the route can be changed as a result, a new flow avoiding the unexecutable task (T) is created in Step Q13. At this time, a task flow having a new route in which the unexecutable task (T) is totally cut is created or another task having a task similar to the unexecutable task (T) is adopted.

Then, the task flow whose route has been modified is registered to the execution flow storage section 9 in Step Q11. When the route change condition indicates that the route cannot be changed in Step Q12, data indicating that the task flow is unmodifiable is transmitted to the task executing means 10 in Step Q14.

As described above, receiving the alarm indicating an abnormality from the task executing means 10, the task execution person modifying means 15 modifies the task flow currently being executed, causes all the processes of the task flow currently being executed to be performed and sends the above-mentioned execution results to the execution result transmitting section 121.

Further the task execution person modifying means 15 may also modify task execution person of the unexecutable task in accordance with a next plan. For example, the manager determines permitted time in each checkpoint. The task execution person modifying means 15 forecasts the time which the task completes based on time until arrival at each checkpoint in the task. The forecasted time is compared to the permitted time of the task determined by the manager. The task execution person modifying means 15 modifies another task execution person in accordance with above-mentioned technical skill, when execution of the task is later than the permitted time.

Further, the task execution person modifying means 15 can also modify another task execution person at this time, when manager server unit 18 receives a notice from at least one of client units 20 of task execution person. The notice means that the task execution person can not complete the task allocated by the manager server unit 18.

The execution result transmitting section 121 sends the results of each task obtained from the task executing means 10 to the task execution person evaluating section 122. The task execution person evaluating section 122 calculates the evaluation point for pertinent task such as the processing time and the accuracy obtained from a number of errors contained in the results of each task execution person who has been assigned to each task and sends it to the personal data modifying section 13.

The personal data modifying section 13 modifies each personal data such as the adaptability, knowledge, speediness, accuracy and expected value shown in FIG. 3 for the pertinent task of each corresponding task execution person in the personal data file 4 based on each personal data obtained from the results input from the task execution person evaluating section 122.

Further, the execution result transmitting section 121 can send the execution result to the outside host system via the interface for analyzing tool 14, when necessary.

In the work flow system to which the work flow manager server unit 18 constructed as described above is incorporated, the personal data such as the ability in performing the pertinent task of the pertinent task execution person in the personal data file 4 is automatically modified based on each result of each task, besides the task flow modified based on the task evaluation after completing the task. Accordingly, it is not necessary for the manager to modify the stored contents of the personal data file 4 periodically through manual operations for example.

Further, the task execution person of each task of the task flow is allocated to another more suited for the pertinent task, because personal data stored in the personal data file 4 is modified based on the execution results obtained by executing each task flow stored in the task flow file 7.

Accordingly, when the same task is repeatedly executed for example, the task execution person who has been assigned to each task is replaced with the most suitable task execution person every time. Because the task execution person who has a greater ability thus executes the pertinent task always for the same task, the processing efficiency of the task is improved.

Still more, when an unexecutable task is brought about in the process of reading and executing the task flow from the task flow file 7, the task execution person modifying means 15 automatically modifies the task flow currently being executed to the best task flow. Then, the execution of the task flow is automatically restarted from the task where the modification has been made, because the executing means 10 reinstructed of the task execution person modified to execute the task.

As a result, the manager need not necessarily to modify the task flow through manual operations every time when an unexecutable task is brought about, so that the processing task efficiency of the task flow of the whole work flow system may be considerably improved.

When the best task execution person is assigned to a task and when the task execution person is temporarily busy and is unable to complete the task execution person within a permitted time for example, only the task flow currently being executed is shifted to another task execution person and is executed this time on the side of the work flow manager server unit 18. That is, the task flow stored in the task flow file 7 in which the task execution person is not replaced is executed in the next time. Thus, the work flow manager server unit 18 can fully accommodate such abnormality that occurs temporarily.

Further, when an unexecutable task is brought about, the task flow is modified so as to bypass or avoid that task. Then, the execution of the task flow is restarted from the task where the flow has been modified, because the executing means 10 reinstructed the task execution person modified to execute the task.

Thus the work flow manager server unit 18 monitors the execution state of each task comprising the task flow and instructs to modify the task flow or to replace the task execution person assigned to the task when necessary, so that when an unexecutable task is brought about in the middle of execution of the task flow, it automatically modifies the task flow currently being executed so as to eliminate the factor disabling the execution and performs the task flow to the end.

Accordingly, because the task flow will not be left without being executed in the middle of execution thereof for a long period of time without being noticed by the manager, the reliability of the whole work flow system is improved.

Next, the structure and operation of each client unit 20 of task execution person executing each task specified from the work flow manager server unit 18 described above will be explained below.

Figure 9:
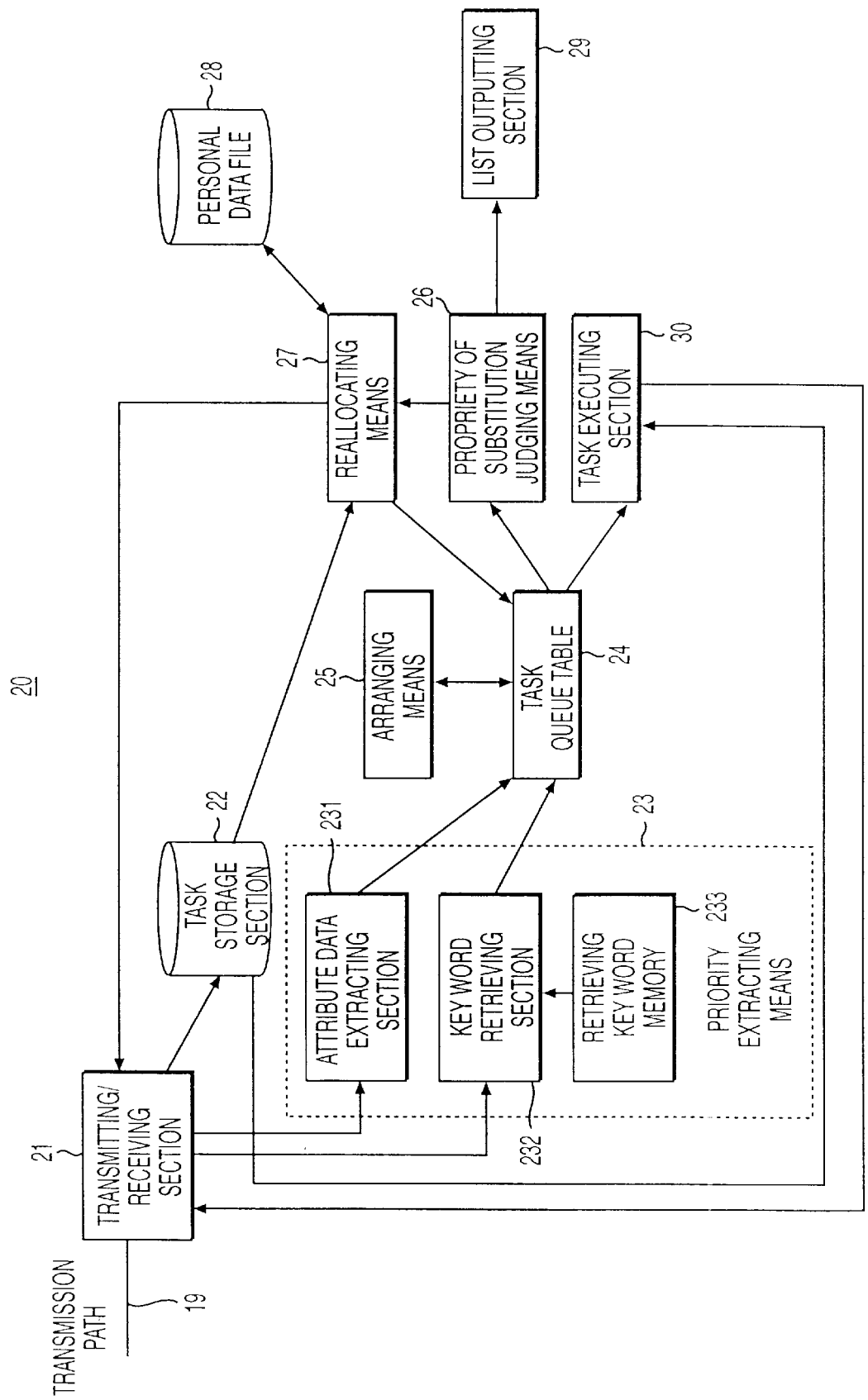
FIG. 9 is a block diagram schematically showing a structure of each client unit of task execution person of the work flow system according to the embodiment of the present invention.

FIG. 9 is a block diagram schematically showing the structure of each client unit 20 of task execution person. The client unit 20 of task execution person is also composed of a type of information processor such as a computer similar to the work flow manager server unit 18 described above.

As shown in the figure, the client unit 20 of task execution person comprises a transmitting/receiving section 21 for transmitting/receiving data to/from the work flow manager server unit 18, a task storage section 22 composed of a HDD or the like for storing the task allocated to each task execution person of the client unit 20, an attribute data extracting section 231 for extracting attribute data appended to the task received through the transmitting/receiving section 21, a key word retrieving section 232 for extracting key words within the allocated task 33, a retrieving key word memory 233 for storing key words for retrieval, a task queue table 24 for storing attributes, key words and the like extracted per each task, arranging means 25 for setting a priority of tasks, a propriety-of-substitution judging means 26 for judging whether tasks 33 can be shifted to another task execution person when many tasks exceeding a predetermined number of tasks are allocated to one task execution person, a list outputting section 29 for outputting a result of this judgment, a personal data file 28 which is almost the same as the personal data file 4 in FIG. 2, reallocating means 27 for reallocating a substitute task execution person of a task and instructing that task execution person to execute the task when the pertinent task is modified and a task executing section 30 for executing an allocated task.

The operation of each section will be explained below.

Each task directly received from the work flow manager server unit 18 via the transmitting/receiving section 21 or transferred from another client unit 20 of task execution person and specifying a task execution person who operates its own client unit 20 of task execution person is stored temporarily in the task storage section 22 until it is executed.

Three kinds of key words, i.e., [High], [Middle] and [Low], for retrieving in the task are stored in the retrieving key word memory 25. For example, there are such key words as "secret," "important," and "president" as key words having a higher degree of importance, as "client" and "meeting" as key words having an intermediate degree of importance and as "connection" and "salesman" as key words having a lower degree of importance. The degree of importance of these key words may be freely set by the task execution person.

As shown in FIG. 10, a title, received time and date, a number of times of appearance of the three kinds of key words [H], [M] and [L] contained in the pertinent task, a priority of attribute and a final priority of each task received via the transmitting/receiving section 21 are stored in the task queue table 24. It is noted that each data concerning a task already executed or a task transferred to another client unit 20 of task execution person to be executed by another task execution person is erased in this task queue table 24.

The transmitting/receiving section 21 writes the task received via the transmission path 19 to the task storage section 22 and sends it to the attribute data extracting section 231 and the key word retrieving section 232 as well.

The attribute data extracting section 231 extracts the title appended at the head of the task received via the transmitting/receiving section 21 and sets it at a new area of the task queue table 24 shown in FIG. 10. Next, the attribute data extracting section 231 extracts attributes such as a processing period, transmitted date, dispatch, all possible dispatch and the like concerning the execution sequence set in the area next to the title at the head of the task and set by the work flow manager server unit 18 and converts those attributes into numerical values of 0 to 5 of attribute priorities for example by using a predetermined formula. It is noted that the higher the numerical value, the higher the priority is.

The attribute data extracting section 231 sets the calculated attribute priority in an area of the task of the title set previously in the task queue table 24 shown in FIG. 10.

The key word retrieving section 232 retrieves within the main body (text) of the task received via the transmitting/receiving section 21 with each key word registered in the retrieving key word memory 233 and sets each count of appearance of three kinds of key words [H], [M] and [L] in the area of the pertinent task within the task queue table 24.

The arranging means 25 determines the task queue which shows final priority concerning to the degree of importance of each task registered within the task queue table 24 in FIG. 10 based on the count of appearance of the key words and the attribute priority.

The method for determining the priority will be explained below. Basically, it is determined giving priority to the count of appearance of the key words over the attribute priority. The task queue which shows final priority is determined corresponding to the count of appearance of [H] key words. For example, when counts of appearance of [H] key words in each task having titles A, B and C are 4, 5 and 3, then their priority will be 2, 3 and 1. It is noted that the higher the number, the higher the priority is as described before.

In cases when there are a plurality of tasks whose counts of appearance of [H] key words are equal, the task queue which shows priority of the tasks is determined with counts of appearance of next [M] key words as shown in FIG. 10. When there are a plurality of tasks whose counts of appearance of [M] key words are equal, the task queue which shows priority of the tasks is then determined with counts of appearance of next [L] key words.

When the task queue which shows final priority cannot be determined even with each count of appearance of three kinds of key words of [H], [M] and [L], it is determined by using the attribute priority. The attribute priority is inserted among the counts of appearance of three kinds of key words of [H], [M] and [L] to raise the determining order of the attribute priority as shown in FIGS. 11a and 11b. For example, in the case of FIG. 11a, the attribute priority is inserted between the count of appearance of [H] key words and that of [M] key words and the task queue which show final priority is determined based on the attribute priority when it cannot be determined by the count of appearance of [H] key words.

In the case of FIG. 11b, the attribute priority is inserted between the count of appearance of the [M] key words and that of [L] key words and the task queue which shows final priority is determined based on the next attribute priority when it cannot be determined by the count of appearance of each key word of [H] and [M].

Accordingly, the task queue which shows final priority may change depending on the position where the attribute priority is inserted as shown in FIGS. 11a and 11b.

While the arranging means 25 basically determines the degree of importance of each task based on the result of retrieval of the key word retrieving section 232, the task queue optimum priority may be determined by incorporating the attribute priority based on the attribute data set by the work flow manager server unit 18 to the above-mentioned determination process as described above.

The propriety-of-substitution judging means 26 determines whether a task having a lower priority in the task queue may be executed by another task execution person when there registered more than a predetermined number of tasks within the task queue table 24. For example, when the predetermined number is 5 and eight tasks are stored in the task queue table 24, it is judged whether the tasks can be executed by others from the count of appearance of [H] key words of the tasks having lower priorities 3, 2 and 1. The propriety-of-substitution judging means 26 also outputs that result via the list outputting section 29.

The reallocating means 27 extracts a substitute task execution person who is capable of executing the task which can be executed by others from the personal data file 28 with the procedure similar to the method described above and transmits an instruction to execute the task in substitution, consisting of the pertinent task and the substitute task execution person, to the client 20 of the substitute task execution person via the transmitting/receiving section 21. At the same time, it erases the task already transmitted from the task storage section 22 and the task queue table 24.

The task executing section 30 executes each task registered in the task queue table 24 in accordance with task queue which shows priority and transmits a notice of end to the work flow manager server unit 18 via the transmitting/receiving section 21 every time the execution is completed. At the same time, it erases the task already transmitted from the task storage section 22 and the task queue table 24.

Figure 12:
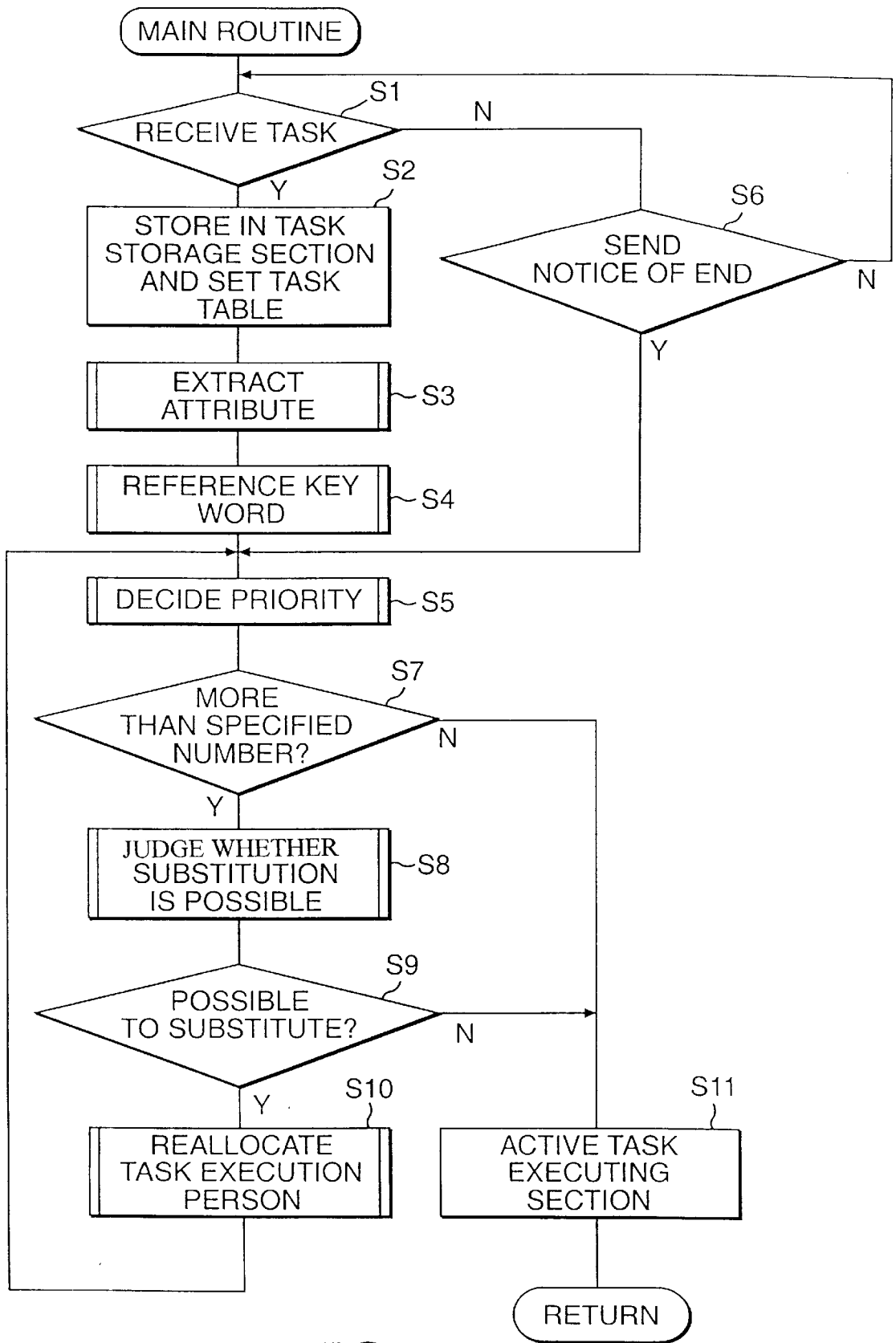
FIG. 12 is a flowchart showing an operation of each client unit of execution person.

FIG. 12 is a flowchart showing the operation of the process of the whole client unit 20 of task execution person constructed as described above.

When a new task is input via the transmitting/receiving section 21 in Step S1 in FIG. 12, it is stored in the task storage section 22 and is set in the task queue table 24 in Step S2. Next, the attribute data extracting section 231 is activated to extract attribute data of the task received, to calculate an attribute priority and to set it in the task queue table 24 in Step S3. Further, the key word retrieving section 232 is activated to detect key words contained in the received task and to set a count of appearance of each key word in the task queue table 24 in Step S4.

In Step S5, the arranging means 25 is activated to decide the task queue which shows final priority of the task registered in the task queue table 24. It is noted that the task queue which shows priority is decided again in Step S5 even when a notice of end is sent out in Step S6.

After completing the decision of the task queue which shows priority, it is determined in Step S7 whether there are registered more than a specified number of tasks in the task queue table 24. When it is determined in Step S7 that there are registered more than the specified number of tasks in the task queue table 24, the propriety-of-substitution judging means 26 is activated to judge whether there are tasks which can be executed by others in Step S8. When it is determined in Step S9 that there are tasks which can be executed by others, the reallocating means 27 is activated to send an instruction to execute the pertinent task to the client unit 20 of the other task execution person in Step S10. Then, returning to Step S5, the task queue which shows priority is decided again.

It is noted that when it is determined in Step S7 that there are registered less than the specified number of tasks in the task queue table 24, the task executing section 30 is activated in Step S11 because no substituting process needs to be implemented. The task executing section 30 is activated in Step S 11 also when the substitution is not permitted in Step S9.

Thus the task queue which shows priority is decided every time the tasks registered in the task queue table 24 are updated and the tasks are executed and the necessary substitution process is carried out always based on the task queue which shows up-to-date priority.

Even in the work flow system to which the client unit 20 of execution person constructed as described above is incorporated, the task execution person who operates (task execution person) the client unit 20, to which each task composing a task flow is input directly via the work flow manager server unit 18 or via another client unit 20 of task execution person, is unable to handle tasks when they are input in a short time, bringing about a large number of tasks which wait to be executed.

In such a case, the client unit 20 of task execution person calculates the priority among the plurality of tasks which have not been executed yet and executes each task in accordance with task queue which shows priority. Accordingly, an execution of an important task will not be put behind, and thus the reliability of the whole work flow system may be improved further.

Further, when the task storage section 22 stores more than a specified number of tasks waiting to be executed, it is determined whether there area tasks which can be executed by another task execution person or not based on the task queue which show priority determined in advance and a task determined to be executable by another task execution person is transmitted to the client unit 20 of the substitute task execution person. Accordingly, the burden for processing tasks among the client units 20 of task execution person may be dispersed, improving the task processing efficiency of the whole work flow system.

It should be noted that the present invention is not confined to the mode of the embodiment described above. For example, while the task queue which shows final priority has been calculated in the arranging means 25 shown in FIG. 9 based on the count of appearance of key words and the task queue which shows attribute priority as shown in FIGS. 10, 11a and 11b, it is possible to calculate the task queue which shows final priority only by the count of appearance of key words. It is also possible to calculate the task queue which shows final priority only by the attribute priority.

It is further understood by those skilled in the art that various changes and modifications may be made in the present invention without departing from the spirit and scope thereof.

What is claimed is:

1. A work flow system, comprising:
   task dividing means for dividing a work effort into a plurality of tasks;
   a personal data file for storing personal data of each task execution person including executable tasks and an ability to perform each said executable task;
   allocating means for allocating said tasks to client units of the task execution person based on said personal data;
   task execution means for instructing each task execution person to execute at least one of said tasks allocated by said allocating means;
   task execution evaluating means for evaluating an ability of said task execution person to perform at least one of said tasks allocated by said allocating means in accordance with results of completed tasks; and
   personal data modifying means for modifying said personal data based on said results of the completed tasks.

2. The work flow system according to claim 1, wherein said personal data includes at least one item of data relating to adaptability, speediness, accuracy, knowledge of said execution persons, and number of tasks to be completed by the task execution person.

3. The work flow system according to claim 1, wherein said results of said completed tasks include an accuracy based on a processing time and a number of errors.

4. A work flow system, comprising:
   task dividing means for dividing a work effort into a plurality of tasks;
   a personal data file for storing personal data of each task execution person including executable tasks and an ability to perform each said executable task;
   allocating means for allocating said tasks to client units of the task execution persons based on said personal data; and
   a task flow file for storing a task flow including an execution sequence among said tasks allocated by said allocating means, the task execution person allocated for each said task, and status of each said task;
   task executing means for instructing each task execution person to execute at least one of said tasks allocated by said allocating means;

status determining means for determining a status of each said task stored in said task flow file; and task execution person modifying means for judging whether said task allocated by said allocating means is completed within a permitted time, and for reassigning said task to another task execution person based on said personal data in accordance with said status of tasks allocated by said allocating means when said task allocated by allocating means is not completed within the permitted time.

5. The work flow system according to claim 4, wherein said task execution person modifying means controls execution of said work effort so as to commence a next one of said tasks in said work flow when a current of one of said tasks is not completed within the permitted time.

6. The work flow system according to claim 4, wherein said tasks divided by the task dividing means have a plurality of checkpoints for determining the status.

7. The work flow system according to claim 4, further comprising:

execution re-instructing means for re-instructing the task execution person of said task modified by said task execution person modifying means to execute said modified task.

8. A work flow system comprising:

task dividing means for dividing a work effort into a plurality of tasks;

a personal data file for storing personal data of each task execution person including executable tasks and an ability to perform each said executable task;

allocating means for allocating said tasks to client units of the task execution persons based on said personal data;

priority data extracting means for extracting priority data assigned to ones of said tasks allocated by said allocating means, by a manager sever unit; and arranging means for arranging said allocated tasks by said allocating means to form a task queue in accordance with said priority data, a separate task queue being formed for said tasks allocated to each said client unit; and reallocating means for reallocating at least one of said tasks from one of said task queues having more than a predetermined number of tasks to another one of said task queues having less than the predetermined number of tasks.

9. The work flow system according to claim 8, wherein said data for deciding a priority includes a key word representing a degree of importance.

* * * * *